US010896001B1

(12) United States Patent
Volpe et al.

(10) Patent No.: US 10,896,001 B1
(45) Date of Patent: Jan. 19, 2021

(54) NOTIFICATIONS IN INTEGRATED CIRCUITS

(71) Applicant: Amazon Technologies, Inc., Seattle, WA (US)

(72) Inventors: Thomas A. Volpe, Austin, TX (US); Nafea Bshara, San Jose, CA (US); Raymond Scott Whiteside, Austin, TX (US); Ron Diamant, Albany, CA (US)

(73) Assignee: Amazon Technologies, Inc., Seattle, WA (US)

(*) Notice: Subject to any disclaimer, the term of this patent is extended or adjusted under 35 U.S.C. 154(b) by 187 days.

(21) Appl. No.: 16/145,050

(22) Filed: Sep. 27, 2018

(51) Int. Cl.
*G06F 11/00* (2006.01)
*G06F 3/06* (2006.01)
*G06F 11/07* (2006.01)
*G06F 13/16* (2006.01)

(52) U.S. Cl.
CPC .......... *G06F 3/0659* (2013.01); *G06F 3/0604* (2013.01); *G06F 3/0673* (2013.01); *G06F 11/0721* (2013.01); *G06F 11/0751* (2013.01); *G06F 11/0772* (2013.01); *G06F 13/1668* (2013.01)

(58) Field of Classification Search
CPC .. G06F 3/0659; G06F 11/0721; G06F 3/0604; G06F 3/0673; G06F 11/0751; G06F 11/0772
USPC .......................................................... 714/57
See application file for complete search history.

(56) References Cited

U.S. PATENT DOCUMENTS

| 7,379,860 | B1 | 5/2008 | Bartz et al. |
| 7,681,078 | B2 | 3/2010 | Moyer |
| 7,865,771 | B2 | 1/2011 | Yang |
| 8,095,917 | B2 | 1/2012 | Stall |
| 9,104,599 | B2* | 8/2015 | Atkisson ............... H04L 12/403 |
| 2008/0010621 | A1 | 1/2008 | Williams |
| 2009/0049312 | A1 | 2/2009 | Min |
| 2010/0332909 | A1* | 12/2010 | Larson ................ G06F 11/3495 714/40 |

(Continued)

OTHER PUBLICATIONS

Texas Instruments wiki page "Embedded Trace Buffer", retrieved from https://processors.wiki.ti.com/index.php/Embedded_Trace_Buffer (Year: 2020).*

(Continued)

*Primary Examiner* — Yair Leibovich
(74) *Attorney, Agent, or Firm* — Kilpatrick Townsend & Stockton LLP

(57) ABSTRACT

Provided are integrated circuit devices and methods for operating integrated circuit devices. In various examples, an integrated circuit device can be operable to determine, at a point in time during operation of the integrated circuit device, to generate a notification. The notification can include a type and a timestamp indicating the point in time. The notification can also include information about an internal status of the integrated circuit at the point in time. The device can further select in a queue from a plurality of queues in a processor memory of the computing system that includes the integrated circuit. The device can further generate a write transaction including the notification, where the write transaction is addressed to the queue. The device can further output the write transaction using a communication interface of the device.

26 Claims, 9 Drawing Sheets

(56) References Cited

U.S. PATENT DOCUMENTS

2012/0124047 A1  5/2012  Hubbard
2013/0346594 A1  12/2013 Banerjee et al.
2014/0305525 A1  10/2014 Le Moing et al.
2015/0100767 A1  4/2015  Topham
2015/0100842 A1  4/2015  Rao et al.
2016/0142940 A1  5/2016  Teo et al.
2017/0083434 A1  3/2017  Potash
2017/0083464 A1  3/2017  Potash
2018/0365017 A1  12/2018 Shirvani et al.

OTHER PUBLICATIONS

U.S. Appl. No. 16/146,834 , Reconfigurable Instruction, filed Sep. 28, 2018.
U.S. Appl. No. 16/200,602 , Configurable Reporting for Device Conditions, filed Nov. 26, 2018.
U.S. Appl. No. 16/200,620 , Operational Management of a Device, filed Nov. 26, 2018.
U.S. Appl. No. 16/216,855 , Event-Based Device Performance Monitoring, filed Dec. 11, 2018.
U.S. Appl. No. 16/216,873 , Execution Synchronization and Tracking, filed Dec. 11, 2018.

* cited by examiner ns in Integrated# NOTIFICATIONS IN INTEGRATED CIRCUITS

BACKGROUND

Understanding the internal status of an integrated circuit device, such as a processor, while the device is in operation can be desired for a number of reasons. For example, the internal status can indicate whether the hardware of the device is operating correctly, and when the device is not operating correctly, information about the internal status can be used to debug the device. As another example, when the device executes program instructions, the internal status can indicate the progression of the instructions. As another example, the internal status can indicate whether the device is meeting performance requirements, such as whether the device is executing instructions at an expected rate or whether the device is transferring data at an expected rate.

BRIEF DESCRIPTION OF THE DRAWINGS

Various embodiments in accordance with the present disclosure will be described with reference to the drawings, in which.

DETAILED DESCRIPTION

Figure 1:
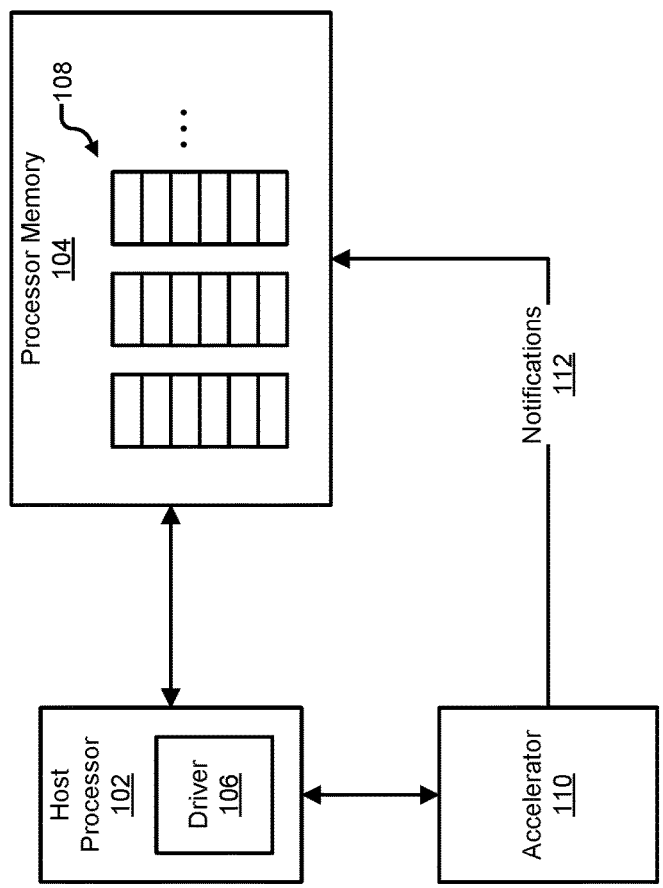
FIG. 1 includes a block diagram that illustrates an example of a computing system.

Various mechanisms may be available to determine the internal operation of an integrated circuit device. For example, the device can be made to output information to a display device or to a file. Software, for example, can cause information to be printed to a screen or saved to a hard drive. In this example, the print statements from the software can indicate a location in the execution of the instructions that comprise the software. As another example, hardware signals, such as interrupts, can be captured by software executing on the device. In many cases, the interrupt signal itself can provide information about a state of the device, and/or software can read a register that stores information that may describe what caused the hardware to generate the interrupt signal.

Outputting to a display or a file, or handling an interrupt, can have a significant impact on the operation of the integrated circuit device, however. For example, outputting to a display or a file can require the device to stop most or all other operations while the device transacts with an input/output (I/O) device. Similarly, determining the cause of an interrupt signal can require the device to cease other operations. In these and other examples, the disruption of the operation of the device in order to output internal state information can change or affect the internal state being output. For example, because the device is working on the output, the device may not be performing a problematic operation, such that the output hides the problem. As another example, output for purposes of determining the performance of the device may not be accurate because the performance being measured includes the outputting operations.

In addition to the above, the internal status that can be output by the device may provide information that can be used to debug the device or to debug code that is executing on the device, but the information that can be obtained may be difficult to relate together. For example, an interrupt signal can indicate that a particular situation in the operation of the hardware has occurred, but may not indicate which instructions the hardware was executing when the situation occurred. In this example, the instructions can include ones for outputting a current code execution status, but the output mechanism may be independent of the interrupt mechanism, such that it may not be easy to correlate the output with the cause of the interrupt.

In various implementations, provided are systems, methods, and devices for a notification mechanism, which can enable an integrated circuit device to output information about an internal status of the device with minimal disruption to other operations of the device. In various implementations, the notification mechanism can include circuitry in a device, such as a processor, which can enable the device to output information about the device's internal state. Execution of instructions, for example, can continue in the device while the notification circuitry generates and outputs a notification. In various implementations, the notification can be output to a memory from which the notification can later be read and processed. For example, the notifications can be stored in queues in processor memory, with different queues being designated for notifications of different types or categories. In this example, software executing on a computing system's primary processor can configure the queues, read notifications from the queues, and determine what actions should be taken for each notification.

In various examples, a notification can include information such as a notification type, a timestamp indicating when the notification was generated, and information about an internal status of the integrated circuit device. The device may be able to output different types of notifications, using the same notification circuitry. For example, the device can support an explicit notification instruction, which, when decoded and executed by the device, can cause the device to output a notification with some information about the code being executed by the device. As another example, the device can include an event mechanism, which the device can use to determine whether certain operations, for example at other devices, have occurred. In this example, the event mechanism can output notifications when a change in the status of an event occurs. As another example, the device can output notifications when certain errors occur, such as incorrect behavior of the hardware or of the code being executed by the device.

A notification, as described herein, can enable an integrated circuit device to output information about the internal status of the device, without having to conduct time consuming I/O operations. Additionally, the device can use a single time source for adding timestamps to the notifications, so that the notifications can be used to reconstruct a timeline of the operation of the device. The notification mechanism thus enables visibility into the operation of the device, debugging information about both the hardware and the execution of software code, and the ability to measure the performance of the device, as well as other uses.

In the following description, various examples will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 includes a block diagram that illustrates an example of a computing system 100. In this example computing system 100, a device referred to here as an accelerator 110 includes a notification mechanism, which enables the accelerator 110 to output information about the accelerator's internal operations. The example computing system 100 further includes a host processor 102 and a driver 106 that may be executing on the host processor 102. The computing system 100 can include other components that are not illustrated here.

The host processor 102 of this example is a general purpose processor for executing program instructions. The host processor 102 can also be referred to as the computing system's primary processor, and/or as a Central Processing Unit (CPU). The host processor 102 can be implemented using an integrated circuit. In some examples, the host processor 102 can include multiple processing cores. In some examples, the computing system 100 can include more than one host processor, possibly working in a coordinated manner.

The host processor 102 can be responsible for the overall management and control of the example computing system 100, including executing the computing system's operating system. Operations that the host processor 102 can be responsible for include, for example, executing programs such as device drivers that manage other hardware components in the computing system 100, and processing or responding to input from users or other computing systems, among other examples. For example, in the illustrated example, the host processor 102 is executing a driver 106 that manages the operations of the accelerator 110.

The processor memory 104 is a memory used by the host processor 102 for temporary storage of program code that the host processor 102 is in the process of executing, and/or values on which the host processor 102 is operating. For example, the code for the driver 106 can in the processor memory 104 while the host processor 102 is executing the driver 106. The processor memory 104 is often referred to as Dynamic Random Access Memory (DRAM), though other volatile memory technologies can be used, including, for example, Static RAM (SRAM), Synchronous Dynamic RAM (SDRAM), and Double Data Rate Synchronous Dynamic RAM (DDR), among others. In various examples, non-volatile memory types, such as Flash-based memory, can be used for the processor memory 104.

The accelerator 110 is an integrated circuit device that can be capable of executing program code. The accelerator 110 can be, for example, a type of processor, such as a floating point processor, a graphics processor, a neural network processor, a special-purpose processor, or any other type of integrated circuit device that can execute program code. For example, the accelerator 110 can be a special-purpose processor that executes program code for orchestrating the movement of data within the computing system 100. The accelerator 110 may different from the host processor 102 in that the accelerator 110 may be designed to perform certain functions, such as floating point calculations or graphics rendering, more efficiently than when these operations are performed by the host processor 102. The accelerator 110 can thus offload these operations from the host processor 102, so that the host processor 102 can be free to perform other operations.

In various examples, the accelerator 110 can include a notification mechanism that enables the accelerator 110 to output notifications 112 that describe operations internal to the accelerator 110. In various examples, and as discussed further below, the accelerator 110 can write the notifications 112 to queues 108 in the processor memory 104. The processor memory 104 can include one or more queues 108, where different queues can be used to store notifications of different types. For example, a queue can be designated for storing error notifications, a queue can be designated for storing event notifications, and a queue can be designated for storing explicit notifications. As a further example, different queues can be designated for storing different event notifications, and/or different error types, and/or different explicit notifications. In some examples, the accelerator 110 can, alternatively or additionally, write notifications to other memories in the computing system 100, such as the memory of a transmitter that can send the notifications, over a network, to another computing system.

In various examples, the driver 106 can configure the queues 108, in addition to performing other operations. Configuring the queues 108 can include, for example, determining a size for each queue and requesting an allocation of memory for each queue. The operating system can, for example, allocate, for each queue, a portion of the memory allocated to the driver 106, or can allocate additional space in the processor memory 104. From the allocated memory, the driver 106 can determine a base address for each queue. The driver 106 can further provide the base address and size, and other information about each queue, to the accelerator 110, so that the accelerator 110 has the information to be able to write to the queues.

In various examples, the accelerator 110 can operate the queues 108 as first-in, first-out (FIFO) buffers. For example, the accelerator 110 can maintain a head pointer and a tail pointer for each queue, with the tail pointer indicating an address in the processor memory 104 at which the accelerator 110 can write new notifications, and the head pointer indicating the next notification to read from the queue. In some examples, the accelerator 110 can use an absolute address for the head pointer and/or the tail pointer, where the absolute address is an address in the address space of the processor memory 104. In some examples, the accelerator 110 can use an index for the head pointer and/or the tail pointer, where the indices indicate an offset from a base address for a queue. When the address space of the processor memory 104 is large (e.g., addresses use 32 or 64 bits) and the queues are small (e.g., fewer than one million entries), using offsets from the base address can require fewer bits to represent the pointers.

In some examples, the accelerator 110 and the driver 106 can independently maintain the head pointer and tail pointer for each queue. The accelerator 110, for example, can include registers that store the pointer values, and the driver 106 can use memory locations in the processor memory 104 to store the pointer values. In this example, the accelerator 110 can notify the driver 106 whenever the accelerator 110 adds a notification to a queue, so that the driver 106 can update the driver's version of the tail pointer. For example, the write transaction for writing the notification to the processor memory 104 can be received at the driver 106, and can serve to inform the driver 106 to update the driver's copy of the tail pointer. Alternatively or additionally, the accelerator 110 can follow writing of a notification with a write to the memory address that stores the tail pointer for the driver 106, to indicate a new tail pointer value. Alternatively or additionally, the driver 106 can periodically read the tail pointer from the accelerator 110 to determine whether the tail pointer has changed.

As a further example, whenever the driver 106 reads a notification from a queue, the driver 106 can inform the accelerator 110 to update a head pointer for the queue. For example, the driver 106 can write to the accelerator 110 to indicate a head pointer update. In some examples, the driver 106 can send a value to the accelerator 110, where the value indicates a number of indices by which the accelerator 110 should move the head pointer.

An alternative or additional method for informing the driver 106 that the accelerator 110 has added a notification to a queue is to use a bit or flag in the notifications to so indicate. For example, each notification can include a bit or a set of bits, which are referred to herein as the phase or phase value. In this example, the accelerator 110 can change the value of the phase whenever the entries in a queue wrap from the end of the queue back to the beginning. For example, the driver 106 can initially, before any notifications are received, write all zeros to each entry in a queue. In this example, when the accelerator 110 starts to send notifications, the accelerator 110 can set the phase value in each notification to one. The driver 106 can then periodically check the queue entry pointed to by the head pointer to see if the phase value has been changed from zero to one, and when the phase value has changed to one the driver 106 will know that the entry at the head pointer is now a new notification. Also in this example, when the tail pointer wraps around to the first entry in the queue (due to the tail pointer having reached the end of the memory space allocated for the queue and being set to the base address of the queue), the accelerator 110 can start using a value of zero for the phase. When the head pointer also wraps to the first entry in the queue, the driver 106 can then start checking for a phase value of zero instead of one to determine whether the accelerator 110 has added a new entry to the queue. In this example, the driver 106 need not read the tail pointer from the accelerator 110 to determine whether the accelerator 110 has added a notification to a queue.

In various examples, an operation of the driver 106 can include reading notifications from the queues 108, and determining what, if anything, should be done with the information provided in a notification. For example, the driver 106 can sort the notifications by the timestamps included in the notifications, and can output the sorted notifications to a display or to a file. As another example, the driver 106 can respond to some notifications, such as error notifications, by stopping or resetting the accelerator 110. In other examples, the driver 106 can otherwise change the operation of the accelerator 110 as a result of a notification.

In some cases, a queue may become full, and the accelerator 110 may have more notifications to add to the queue. The queue may have become full, for example, because the accelerator 110 is generating notifications for the queue at a faster rate than the driver 106 is reading the notifications out, or because the queue is too small for the number of notifications that the accelerator 110 is generating, or because the accelerator 110 is experiencing a problem and is generating too many notifications, or for another reason. In some examples, it may be desirable to allow a queue to fill and let notifications be lost, and to otherwise not interfere with the operation of the accelerator 110 when a queue overflow occurs. In these examples, the notifications can include a bit or a field to indicate that notifications are being dropped. The accelerator 110 can set the bit or the field when, for example, a notification the accelerator 110 is about to send may fill the last available entry in the queue. In this example, the accelerator 110 may stop sending notification to the queue that is full until the driver 106 informs the accelerator 110 that there is available space in the queue (e.g., by providing an increment value for the head pointer).

In some examples, it may not be desirable to let the accelerator 110 continue executing instructions when a queue is full. In these examples, when the accelerator 110 finds that there is no room in a queue for an additional notification, the accelerator 110 can stall until the driver 106 informs the accelerator 110 that there is room (e.g., by advancing the head pointer for the queue). Stalling, in this context, means that the accelerator 110 will stop executing instructions until the stall condition is removed. Once the notification can be sent, the accelerator 110 can resume executing instructions. In some examples, whether the accelerator 110 stalls or drops notifications when a queue is full can be controlled using a configuration register in the accelerator 110.

Other operations of the driver 106 can include, for example, loading program code into the accelerator 110 and causing the accelerator 110 to begin executing the program code, among other examples.

Figure 2:
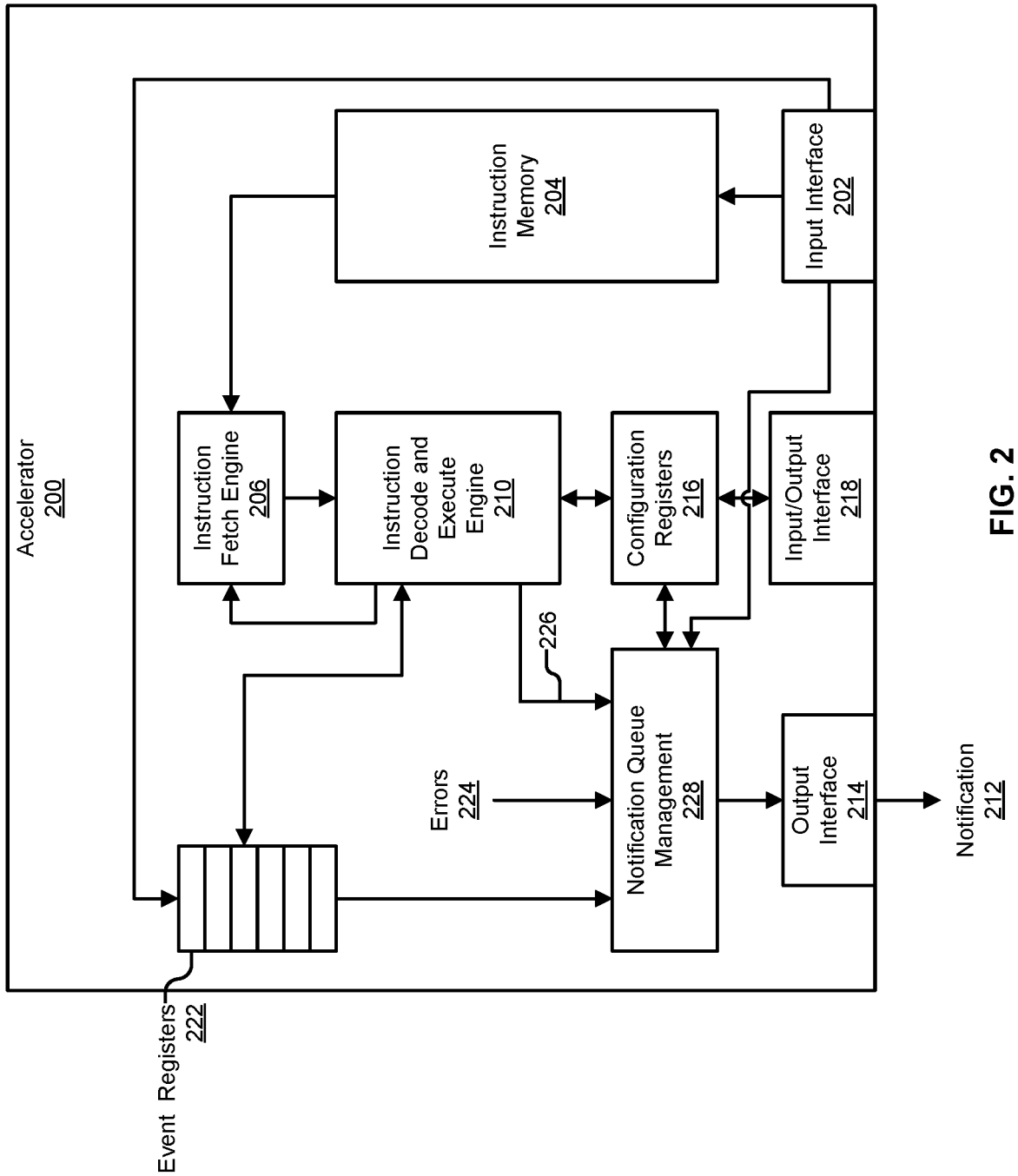
FIG. 2 is a block diagram illustrating an example of an accelerator that can include a notification mechanism.

FIG. 2 is a block diagram illustrating an example of an accelerator 200 that can include a notification mechanism. The accelerator 200 is an example of an integrated circuit device that can execute program instructions, and can also be referred to as a processor. In various examples, the accelerator 200 can be implemented using an integrated circuit device, such as an Application Specific Integrated Circuit (ASIC), a Field Programmable Gate Array (FPGA) or a similar integrated circuit device. In some examples, the accelerator 200 can be incorporated into a larger integrated circuit device. For example, the accelerator 200 can be a component in a System on a Chip (SoC).

In the example illustrated in FIG. 2, the accelerator 200 includes an input interface 202, an instruction memory 204, an instruction fetch engine 206, an instruction decode and execute engine 210, event registers 222, a notification queue management 228 component, and an output interface 214. The accelerator 200 further includes configuration registers 216 and a combined input/output interface 218 that can provide an alternative interface for exchanging data with other components in the computing system. In various examples, each of the blocks illustrated in the example of FIG. 2 can include a portion of the overall integrated circuitry of the accelerator 200.

In various examples, the input interface 202 provides the accelerator 200 with the ability to receive data from other components in the computing system. The data can include program code and other data. For example, a driver program that controls the operation of the accelerator 200 can cause program code to be written to the accelerator 200, which is received at the input interface 202. As a further example, the driver program can also issue a write transaction to update a header pointer for a queue managed by the notification queue management 228, and this write transaction can be received at the input interface 202. The input interface 202 can be implemented, for example, as an Advanced Extensible Interface (AXI) slave interface, for when the computing system's communication fabric includes an AXI bus structure. In various examples, other bus structures and bus protocols can be used.

In various examples, the instruction memory 204 can provide the accelerator 200 with local storage for program code. The instruction memory 204 can be managed by the instruction fetch engine 206, which can keep track of free space in the instruction memory 204, space that is storing not-yet-executed instructions, and space that is storing instructions that the accelerator 200 has already executed. The instruction fetch engine 206 can further keep track of the next instruction that is to be executed, and can fetch this instruction when the instruction decode and execute engine 210 is ready for another instructions, or possibly in advance of the instruction decode and execute engine 210 being ready.

As an example, the instruction memory 204 can be 64 kilobytes (KB) in size, and be logically organized with 32-bit words (e.g., each addressable location stores 32 bits). In some examples, the instruction memory 204 can be protected using Single-Error Correcting and Double-Error Detecting (SECDED) Error Correcting Code (ECC). In some examples, read and write transfers have lengths in multiples of four bytes, and are 4-byte aligned, or else transactions do not complete and the accelerator 200 responds at the input interface 202 with an error.

In various examples, the instruction decode and execute engine 210 decodes instructions read from the instruction memory 204 and executes the instructions. The instructions can, for example, cause the instruction decode and execute engine 210 to initiate the movement of data from one location in the computing system to another (e.g., from a memory to another device in the system), wait on a timer, wait on an event, write a notification to a memory location, or trigger an interrupt, among other operations.

An operation that the instruction decode and execute engine 210 can perform is waiting on an event or checking whether an event has happened. An event is the changing of the status of register in the event registers 222. Thus, waiting on an event involves watching a register associated with the event for a change. The change can be, for example, the setting of a value in the register, or the clearing (e.g., writing to zero) of the register. While waiting for the event to occur, the accelerator 200 may stall and stop executing instructions. Otherwise, when the instruction decode and execute engine 210 decodes a wait-for-event instruction and finds the event has already occurred (e.g., a particular value is already present in the event register), then the accelerator 200 may proceed to the next instruction. In various examples, events are set or cleared by components external to the accelerator 200, such as other integrated circuit devices in the computing system. Thus, events can be used to synchronize the activity of the accelerator 200 with the activity of the other components in the system. In various examples, the accelerator 200 can include multiple event registers, each of which can indicate the occurrence of a different event.

In various examples, a change in the status of one of the event registers 222 can cause the accelerator 200 to send a notification 212. For example, when the event register is set, the notification queue management 228 can determine to send a notification 212 that identifies the register, and indicates that the register was set. In various examples, the notification queue management 228 can also send a notification 212 when the event register is cleared. In some examples, the notification queue management 228 can also generate a notification 212 when an event is set twice or cleared twice. In these examples, the notification 212 can indicate that the event was set or cleared twice, which might be erroneous behavior, and thus should be identified.

In these and other examples, the notification 212 can provide information about when synchronization events occurred and/or when the accelerator 200 encountered a synchronization event.

In various examples, whether the notification queue management 228 generates a notification 212 when the status of an event register changes can be enabled or disabled. For example, the configuration registers 216 can include a register for each event that indicates whether a change to the register for the event should cause a notification 212 to be generated.

In various examples, notifications for different event registers can be written to the same queue in processor memory or in different queues. For example, the configuration registers 216 can include one set of registers (e.g., for information such as a base address, a head pointer, and a tail pointer) for one queue in the processor memory, can include a set of registers for each of the events, or can include a set of registers for sets of events, such as groups of eight or more events. In various examples, the number of queues used can be configured by the driver program that controls the accelerator 200.

In various examples, when the notification queue management 228 determines that the queue to which an event notification is to be written will be full when the notification is added to the queue, the notification queue management 228 can set a bit or field in the notification that indicates that the queue reached a full state. This indication can notify the software that reads the queue that additional notifications that may have been written to the queue have instead been discarded or dropped. In these and other examples, the full state of the queue does not interfere with the execution of instructions by the accelerator 200. In various examples, the notification queue management 228 may stop generating event notifications that are to go to a full queue until receiving an indication (e.g., by way of an update to the head pointer for the queue) that the queue has space for additional notifications.

In various examples, a notification 212 can also be generated when accelerator 200 encounters an error 224. Errors 224 can occur due to a problem in the operation of the hardware of the accelerator 200, due to misconfiguration of the accelerator 200, because of problems in the program code, and/or due to the accelerator 200 receiving problematic instructions from other components in the computing system, among other examples. Errors 224 can be detected, for example, by the instruction decode and execute engine 210, such as when the instruction decode and execute engine 210 encounters an instruction that cannot be decoded or that contains invalid fields, among other examples. Errors 224 can, alternatively or additionally, be detected by the instruction fetch engine 206, for example when the instruction fetch engine 206 receives an improperly formatted write transaction for the instruction memory 204. Errors 224 can also, alternatively or additionally, be detected by the notification queue management 228, such as when a notification queue becomes full or the notification queue management 228 is told to generate a notification for which no queue has been configured, among other examples.

In these and other examples, the notification queue management 228 can generate a notification 212 that identifies the error 224. Unlike an interrupt mechanism, the notification 212 can provide all the information for the error, such that additional information about the error does not need to be read from the accelerator 200. Additionally, the notification 212 does not need the immediate attention of the computing system's primary processor, unlike an interrupt, and can be handled whenever the processor has time to read the notification queues.

In various examples, whether a notification 212 is generated for each possible error 224 that can be detected by the accelerator 200 can be controlled by configuration registers. For example, the configuration registers 216 can include a register for each error type that can be used to set an enable or disable indicator for notifications. Error notifications can thus be suppressed in situations where the error is expected to occur or occurrence of the error is not considered significant.

In various examples, the error notifications can be written to one queue in the processor memory or to multiple queues. For example, the configuration registers 216 can include a set of registers (e.g., storing information such as a base address, a head pointer, and a tail pointer) for one queue, or a set of registers for each possible error, or a set of registers for groups of errors, such as errors from the instruction decode and execute engine 210 or errors form the instruction fetch engine 206. In various examples, the number of queues can be configured by the driver program that manages the accelerator 200.

In various examples, when the notification queue management 228 determines that an error queue will be full upon receiving another notification, the notification queue management 228 can set a bit or field in the notification that indicates that additional notifications for the queue may have been lost. In these examples, error notifications may not be considered catastrophic, and the accelerator 200 may be allowed to continue executing instructions. The notification queue management 228 may stop generating error notifications for the queue that is full so long as the queue continues to be full. Once the notification queue management 228 receives an indication that the error queue has space for more notifications (e.g., by way of an update to the head pointer for the queue), the notification queue management 228 can continue generating notifications for the queue.

In various examples, the notification queue management 228 can also generate a notification 212 upon the instruction decode and execute engine 210 decoding an explicit instruction for generating a notification. This type of notification is referred to herein as an explicit notification 226. The notification instruction can enable program code to output notifications at any point during the execution of the program code. The notification instruction can, thus, be used to indicate that a certain set of instructions have been executed or a count of iterations of a loop in the code, among other examples. The explicit notification 226 can provide similar information as a print statement in the program code, without the overhead of having to conduct I/O operations.

In some examples, the generation of explicit notifications 226 can also be enabled or disabled through registers in the configuration registers 216. For example, the configuration registers 216 can include a register that, if set, disables or enables all explicit notifications 226. As another example, the configuration registers 216 an include one or more registers that can identify explicit notifications 226 that are enabled or disabled. The explicit notification 226 can be identified, for example, by a token or counter identifier indicated by the instruction that triggers generation of the notification.

In various examples, explicit notifications 226 can be written to the same queue in the processor memory or to different queues. For example, the configuration registers 216 can include one or multiple sets of registers, where each set of registers is associated with a queue in the processor memory. In this example, each set of registers can store information such as the base address, head pointer, and tail pointer for each queue. In some examples, the driver program may configured a limited set of queues for the explicit notifications 226, such as four, eight, sixteen, or another number of queues. In these examples, a token identifier, counter, identifier or other information included in a notification instruction can designate to which queue the notification 212 should be written.

In various examples, when the notification queue management 228 determines that a queue for an explicit notification 226 cannot accept an additional explicit notification 226, the notification queue management 228 may cause the accelerator 200 to stop executing further instructions. For example, the notification queue management 228 may send a signal to the instruction fetch engine 206 to stop fetching instructions or to the instruction decode and execute engine 210 to stop executing instructions. In these and other examples, because a notification instructions cannot be completely executed, subsequent instructions are not allowed to be executed. In some examples, whether a full queue for explicit notifications causes stalling of the accelerator 200 can be configured using a configuration register.

In addition to generating notifications, the notification queue management 228 can perform other management operations for the notifications. For example, the notification queue management 228 can include a timestamp generator, from which each notification can obtain a timestamp. In this and other examples, the notifications can each obtain a timestamp from the same source, so that the notifications can be correlated to one another based on the timestamps. Additionally, for example, when multiple errors occur concurrently (e.g., in the same clock cycle), or errors occur concurrently with a change of status of an event or an explicit notification 226, or the notification queue management 228 otherwise receives simultaneous requests to generate notifications, the notification queue management 228 can apply the same timestamp to each notification generated. That is, the notification queue management 228 need not queue simultaneous notification requests, and can instead handle each request at the same time (e.g., within the same clock cycle). By applying the same timestamp to concurrently occurring notifications, the notifications can indicate different things that occurred in the accelerator 200 at the same time.

In various examples, when a computing system includes more than one accelerator, timestamp generators in the multiple accelerators can be synchronized, for example by being started on the same value (e.g., at zero) at the same time. For example, the accelerators can be made to exit reset in the same clock cycle, or may wait for an explicit signal before starting the timestamp generators. In some examples, the accelerators may further periodically by synchronized, for example by receiving an updated value for the timestamp, from which each accelerator can subsequently start counting.

The notification queue management 228 can further keep track of the notification queues in the processor memory (and/or another external memory). For example, the configuration registers 216 can include registers that store information such as a base address and size for each queue, as well as the current head pointer location and tail pointer location for each queue. In this example, the notification queue management 228 can update the tail pointer of a queue upon sending a notification 212 to the queue. The notification queue management 228 can, for example, cause a transaction to be sent, either through the output interface 214 or the combined input/output interface 218, that indicates the update to the tail pointer. As another example, the notification queue management 228 can check whether queues are full by examining the head and tail pointers of the queues.

In various examples, the notification queue management 228 can further include a physical queue for storing outgoing notifications. A hardware queue can enable the notification queue management 228 to store notifications that are generated concurrently (e.g., in the same clock cycle), for example. The hardware queue can also enable the notification queue management 228 to store notifications when the output interface 214 is busy being used to output other data. In these and other examples, additional errors that the notification queue management 228 can detect include the hardware queue being full when the notification queue management 228 has more notifications to generate.

In various examples, the output interface 214 provides the accelerator 200 with an interface through which the accelerator 200 can output data to other components in the computing system. The output interface 214 can, for example, connect to a communication fabric in the computing system. The output interface 214 can be implemented, for example, as an AXI master interface, for connecting to an AXI bus structure. In various examples, other bus structures and bus protocols can be used.

In addition to storing information for the notification queues, in various examples, the configuration registers 216 enable certain operations of the accelerator 200 to be modified when the accelerator 200 is in operation, and/or can provide a place from which information about the accelerator 200 can be read. For example, the configuration registers 216 can include registers for enabling or disabling interrupts that can be generated from the accelerator 200. The configuration registers 216 can further include, for example, registers from which a current execution state, current timestamp, statistics, or other data can be read.

In various examples, the configuration registers 216 can be read from and written to through a combined input/output interface 218. The combined input/output interface 218 can provide the accelerator 200 with an alternate communication path to other components in the system. This path can be slower than the paths used by the input interface 202 and the output interface 214, or may provide a more direct connection to the primary processor. In some examples, the combined input/output interface 218 is optional, and the accelerator 200 receives transactions for the configuration registers 216 at the input interface 202, and sends data form the configuration registers 216 out through the output interface 214.

Figure 3:
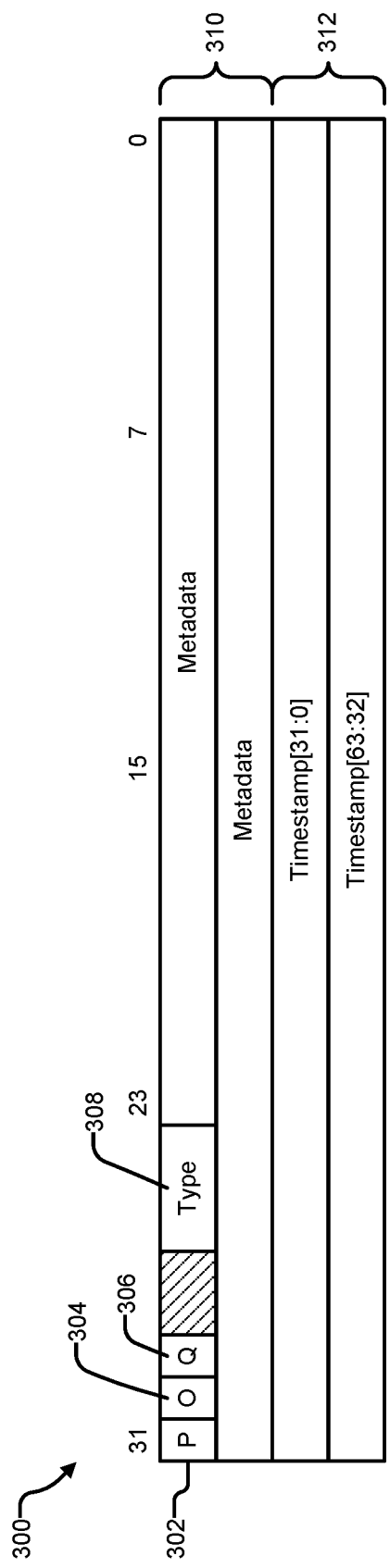
FIG. 3 includes a diagram illustrating an example format for a notification.

FIG. 3 includes a diagram illustrating an example format 300 for a notification. The diagram is being provided to illustrate one example format for notifications, with the understanding that other formats, which can provide similar or different information, are possible. In various examples, an accelerator, such as the accelerator illustrated in FIGS. 1 and 2, can use the example format 300 to compose a notification, and a software program, such as the driver program illustrated in FIG. 1, can expect notifications to be formatted according to the example of FIG. 3. As discussed further below, the example format 300 can be used to define more specific notification formats.

In the example of FIG. 3, the notification format 300 is 32 bits wide and includes a total of 128 bits. In other examples, the format can include more or fewer total bits. In this example, the format 300 includes several single-bit indicators, a field to indicate a type 308, a number of bits designated for providing different metadata 310, and bits designating for providing a 64-bit timestamp. Bit locations that are not being used are indicated with cross hatching.

In the illustrated example, the single-bit indicators include a phase bit 302, a hardware queue overflow bit 304, and a software queue overflow bit 306. As discussed above, the phase bit 302 can be used by software to see whether a queue has a new notification. For example, software such as a driver program can periodically check a queue entry indicated by the head pointer to see if the phase bit in the entry is set to the current phase value. In this example, when the software finds the previous phase value, the software knows that the entry is storing an old notification, and when the software finds the current phase value, the software knows the entry is storing a new notification. The hardware queue overflow bit 304 can indicate that a hardware queue is full and additional notifications could not be added to the queue. The hardware queue can be, for example, a queue in an accelerator, which the accelerator uses to store notifications until the notifications can be sent from the accelerator. The hardware queue overflow bit 304 can be set, for example, in the last notification that the hardware queue can accept before becoming full. The software queue overflow bit 306 can indicate that a queue in the processor memory has become full, and that some notifications for the queue may have been lost. The software queue overflow bit 306 can be set, for example, in the last notification that the queue can accept before becoming full.

The type 308 can be used to indicate a type or classification for a notification. In this example, the type 308 is three bits, thus enabling up to eight different types of notifications to be defined. In some examples the type 308 can identify a queue or subset of queues to which a notification should be written.

The metadata 310 field can be used to provide information that is specific to notifications of different types. In some examples, the content of the metadata 310 is determined by the value in the type 308 field. In some examples the content of the metadata 310 may be partially determined by the type 308, and may further be determined by values stored in the metadata 310. Examples of different metadata are provided in further examples discussed below.

The timestamp 312 can include a value obtained from a timestamp generator that is part of the notification mechanism. In various examples, all notifications receive a timestamp from the same generator. Additionally, notifications that are triggered in the same clock cycle can receive the same timestamp. The timestamp can thus be used to relate one notification to another.

Figure 4:
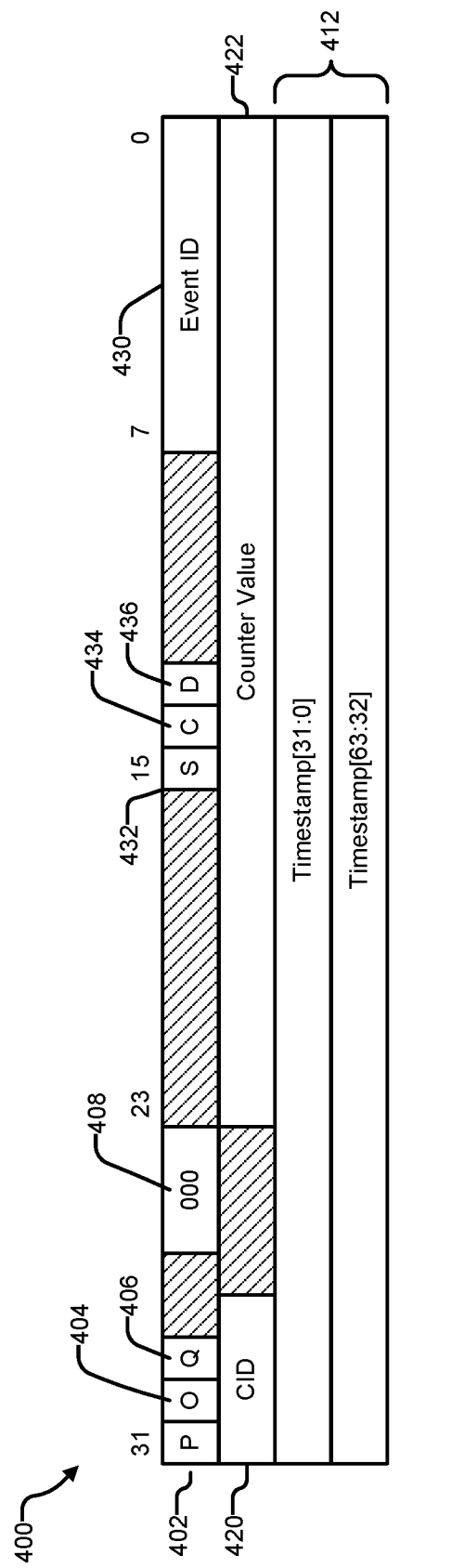
FIG. 4 includes a diagram illustrating an example format for an event notification.

FIG. 4 includes a diagram illustrating an example format 400 for an event notification. As discussed above, an event notification can be generated when the status of a register associated with an event changes. Status changes can include, for example, writing to the register to indicate that the event has occurred or clearing (e.g., writing to zero) the register so that the register is ready for the next occurrence of the event.

In the example of FIG. 4, the format 400 is based on the example format illustrated in FIG. 3. Thus, the format 400 of FIG. 4 includes a phase bit 402, a hardware queue overflow bit 404, and a software queue overflow bit 406, among various single-bit indicators, as well as a type 408 and a timestamp 412. In this example, the value "000" is used to indicate that the notification provides information about an event. Bit locations that are not being used for this notification are indicated with cross hatching.

Among the single-bit indicators, the format 400 further includes a set bit 432, a clear bit 434, and a double bit 436. The set bit 432 can indicate whether the register for the event was set, while the clear bit 434 can indicate whether the register was cleared. In this example, separate set and clear bits enables a notification to indicate that the event register was both set and cleared in the same clock cycle. The double bit 436 can indicate that a set or a clear happened more than once. While setting or clearing an event register may have been deliberate, sometimes setting or clearing the register more than once may have been a mistake. Thus, when an event register is set or cleared more than once in a row, a notification can be generated with the double bit 436 set.

The format 400 of FIG. 4 further includes an event identifier 430, a counter identifier 420, and a counter value 422. The event identifier 430, in this example, is an 8-bit value that can be used to identify different events. As discussed above, an accelerator may have as many as 256 event registers, as an example. The event identifier 430 can thus identify which of the event registers underwent a change of status.

The counter identifier 420 can be used to identify one of multiple counters that can be maintained by an accelerator, and the counter value 422 field can include the value of the counter at the time the notification is generated. In the illustrated example, the counter identifier 420 is four bits in order to identify up to sixteen counters. In various examples, a counter is a register that is incremented or decremented by program instructions. Counters can be used by program code that executes on the accelerator for various purposes. For example, the program code can use a counter to count a number of iterations of a loop in the code, or the number of times a certain instruction or set of instructions occurs. In some examples, the accelerator does not modify a counter other than at the direction of instructions in the program code (e.g., instructions for setting a value in the counter, incrementing the counter, or decrementing the counter, among others).

In various examples, program code executing on the accelerator can manipulate a counter to make the counter value meaningful with respect to an event or events. For example, instructions can increment or decrement the counter whenever the accelerator determines that the event has occurred. As another example, instructions can be using a counter to count other things, such as repetitions of a certain set of instructions, which can then be reported out with the occurrence of an event at the end of the program code.

In various examples, the counter selected for inclusion in an event notification can be determined in various ways. For example, configuration registers can associate a counter with an event register, such that the configuration registers can be used to determine which counter to include in the notification for a particular event. In some examples, a configuration register can designate the counter that is used for all event notifications. Alternatively or additionally, in some examples, an instructions for waiting on or checking an event can specify a counter identifier, which, if notification is generated upon the event occurring, will be included in the notification. Alternatively or additionally, in some examples, the event notification will always use particular counter, or can use the last counter that was incremented or decremented, or another technique can be used to specify the counter.

Figure 5:
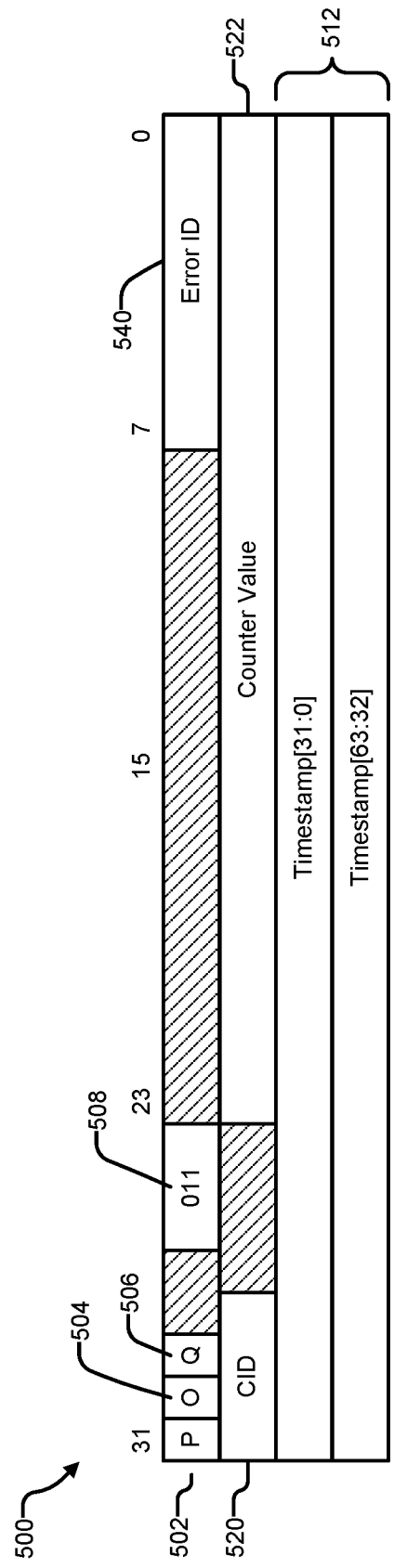
FIG. 5 includes a diagram illustrating an example format for an error notification.

FIG. 5 includes a diagram illustrating an example format 500 for an error notification. As discussed above, an error notification can be generated when an accelerator determines that an error has occurred. The error can be a problem in the operation of the hardware of the accelerator, a problem in input received by the accelerator, a problem in the execution of instructions, or another problem. In the example of FIG. 5, the example format 500 is based on the format illustrated in FIG. 3, and thus the format 500 of FIG. 5 includes a phase bit 502, a hardware queue overflow bit 504, a software queue overflow bit 506, a type 508, and a timestamp 512. In this example, the value "011" is used to indicate the error notification type. Bit locations that are not being used for this notification are indicated with cross hatching.

The format 500 further includes an 8-bit error identifier 540, a counter identifier 520, and a counter value 522. The error identifier 540 can be used to indicate the error that caused the notification to be generated. In some examples, identifiers for the errors may be hard-coded in an accelerator. In some examples, the identifiers for different errors may be indicated by configuration registers in the accelerator.

Similar to the example of FIG. 4, the counter identifier 520 of FIG. 5 can identify one of multiple counters in an accelerator and the counter value 522 can provide the value of the counter at the time the notification was generated. In various examples, program code can manipulate a counter to associate the counter with an error. For example, when an error occurs repeatedly, instructions can increment or decrement the counter to count each occurrence. As another example, a counter that is not associated with an error can be captured. For example, the program code may be using a counter to count iterations of a loop or repeated execution of a particular set of operations. In this example, capturing a counter value in error notifications can assist in debugging a problem with this code or a problem that happens to occur during the execution of this code.

In various examples, the counter to be use in an error notification can be designated in various ways. For example, configuration registers can associate counters with errors, so that the registers can be used to determine the counter to use when an error occurs. In some examples, a configuration register can designate a counter that is to be used for all error notifications. Alternatively or additionally, error notifications will always use a particular counter, can use the last counter that was incremented or decremented, or another technique can be used to specify the counter.

Figure 6:
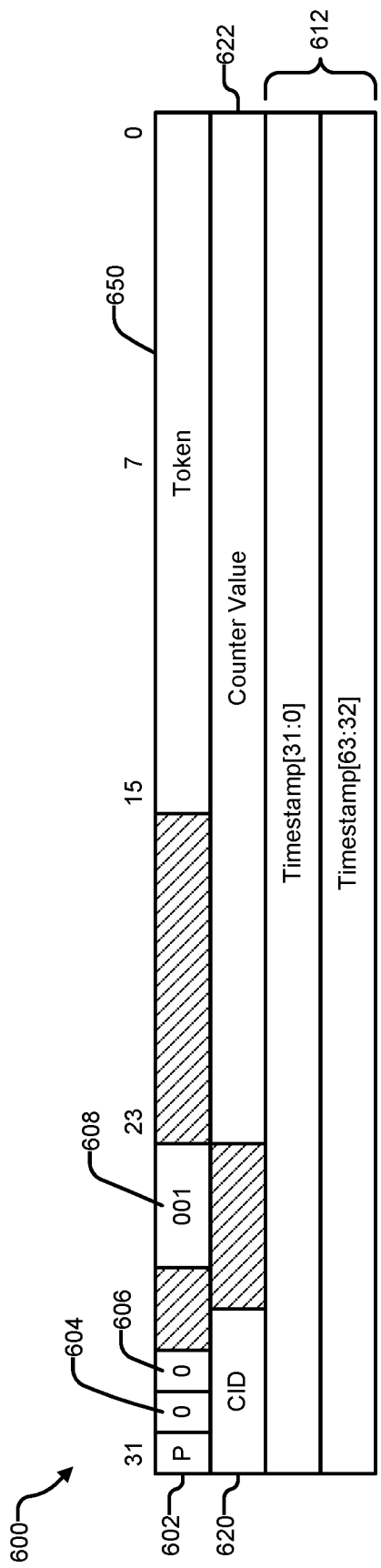
FIG. 6 includes a diagram illustrating an example format for an explicit notification.

FIG. 6 includes a diagram illustrating an example format 600 for an explicit notification. As discussed above, an explicit notification can be generated through the use of a notification instruction that is present in the program code. The notification instruction enables the program code itself to output information. Output from the program code can be used, for example, to see the progress of the execution of the code, to debug the code, and/or to determine the performance of the code (e.g., how much time did the accelerator take to execute the instructions). Performance evaluation, in particular, can be assisted by the timestamp 612 present in the notifications.

The example format 600 is based on the format illustrated in FIG. 3, and thus the format 600 of FIG. 6 includes a phase bit 602, a hardware queue overflow bit 604, a software queue overflow bit 606, a type 608, and a timestamp 612. The value of "001" is used in this example to indicate the explicit notification type. In some examples, overflows and loss of explicit notifications is not allowed, thus, in these examples, the hardware queue overflow bit 604 and software queue overflow bit 606 always indicate non-occurrence (e.g., by being set to zero). Bit locations that are not being used for this notification are indicated with cross hatching.

The format 600 additionally includes a token 650 field, a counter identifier 620, and a counter identifier 620. The token 650 field can be used by the program code to identify the explicit notification. In some examples, a value for the token can be provided in the notification instruction, thus in these examples the value of the token is determined by the program code. The counter identifier 620 can be used to identify a counter and the counter value 622 can capture the value of the counter at the time that the explicit notification is generated. In various examples, the notification instruction can specify the counter identifier 620.

Figure 7:
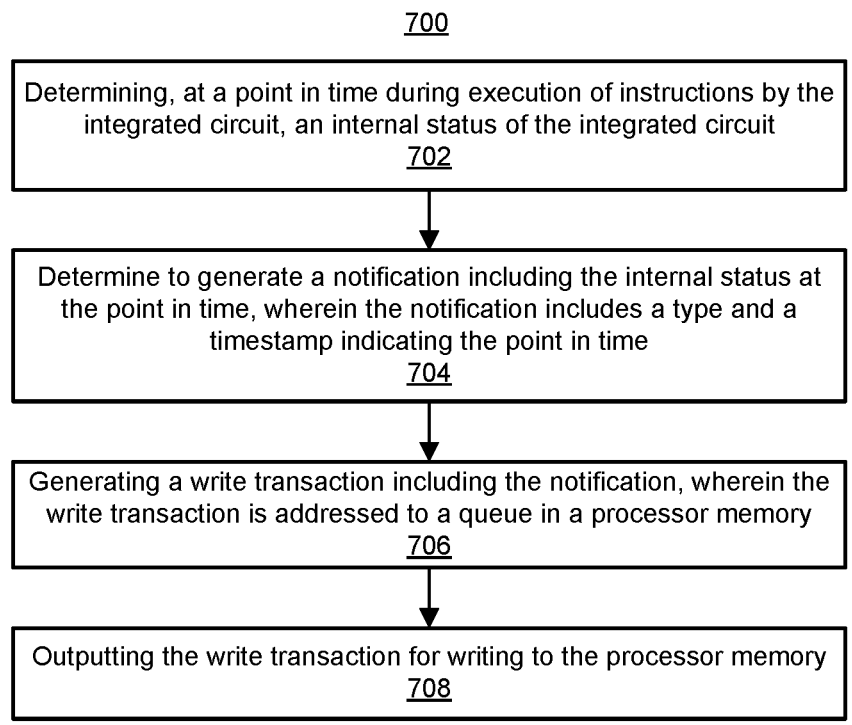
FIG. 7 includes a flowchart that illustrates an example of a process for operating an integrated circuit.

FIG. 7 includes a flowchart that illustrates an example of a process 700 for operating an integrated circuit. The example process 700 includes steps by which the integrated circuit can generate and send a notification, as a mechanism for outputting information about an internal status of the integrated circuit. The process 700 can be implemented by an integrated circuit device, such as, for example, the accelerator illustrated in FIGS. 1 and 2.

At step 702, the process 700 includes determining, at a point in time during execution of instructions by the integrated circuit, an internal status of the integrated circuit. The internal status can describe a current operational state of hardware of the integrated circuit. For example, the integrated circuit may determine that a change of status of a register associated with an event has occurred. In this example, determining to generate the notification is based on the change of status, and the internal status included in the notification indicates the change of status. The change of status may be that a particular value has been set in the register or that values have been cleared from the register (e.g., written to zero or otherwise invalidated). The integrated circuit may be monitoring the register for the change of status. The status may be changed by a write transaction received by the integrated circuit from external to the integrated circuit, such as from another integrated circuit device that is able to communicate with the integrated circuit. Alternatively or additionally, the change of status may have been caused by the integrated circuit device itself. For example, the integrated circuit device may have cleared the register. In various examples, the process 700 may further include determining whether generation of the notification for the event is enabled or disabled, for example by reading a configuration register in the integrated circuit. In some examples, the integrated circuit includes a plurality of registers associated with a plurality of events. In these examples, the notification can include an identifier that identifies the event.

As another example, the current operational state of the hardware can include the occurrence of an error. For example, the integrated circuit can determine that an error in an operation of the integrated circuit has occurred. In this example, determining to generate the notification is based on the error having occurred, and the internal status included in the notification can indicate or identify the error. In some examples, the process 700 further includes determine whether generation of the notification for the error is enabled or disabled, for example by reading a configuration register that stores this information.

As another example, the internal status can describe a current operational state of the execution of the instructions. For example, the integrated circuit device may decode an instruction for generating a notification. That is, the instruction set for the integrated circuit device can include an instruction that explicitly requests that a notification be output. In this example, the internal status included in the notification indicates information provided by the instruction. Such information can include, for example, a token (e.g., a number or value) and/or a counter identifier and counter value, among other examples.

At step 704, the process 700 includes determining to generate a notification including the internal status at the point in time, wherein the notification includes a type and a timestamp indicating the point in time. The type can identify the notification as being one of a number of different types, including, for example, notifications for synchronization events, errors, and explicit notifications. In various examples, a same notification format can be used to output notifications that describe hardware operations, software operations, and/or hardware operations triggered by software operations, among other examples.

In various examples, a same timestamp is used for the notification and all subsequent notifications generated by the integrated circuit. For example, the process 700 can include determining to generate a second notification concurrent with determining to generate the notification. Concurrent, in this example, can mean that, at the point in time during the execution of the instructions, the integrated circuit made two separate determinations regarding the internal status of the integrated circuit, with each determination resulting in the generation of a separate notification. For example, two errors may have occurred in the same clock cycle, or an event register may have been set in the same clock cycle as when a notification instruction is executed. In these and other examples, the second notification includes a same timestamp as the timestamp included in the first notification, to indicate that the notifications are for concurrent internal statuses of the integrated circuit.

In various examples, the notification can include other information. For example, the notification can include a field, which can be referred to as a phase value, that can be used to indicate whether the notification that is newly added to a queue or was previously written to the queue and has already been processed. As another example, the notification can include a field that indicates whether a hardware queue, which can be used to store notifications that are waiting to be written to memory, has overflowed. As another example, the notification can include a field that indicates whether a software queue, which can be used to store notifications in memory, has overflowed. As another example, a notification can include a counter identifier and a counter value, where the counter identifier identifies a counter that a can be associated with the notification and the counter value captures a value of the counter at the time the notification is generated. As discussed above, counters can be maintained by the integrated circuit for use by the instructions executed by the integrated circuit, which can include instructions to set, increment, and/or decrement the counters, for example.

At step 706, the process 700 includes generating a write transaction including the notification, wherein the write transaction is addressed to a queue in a processor memory. In some examples, the process 700 can further include selecting the queue from a plurality of queues in the processor memory. In these examples the queue can selected based on the type included in the notification. Alternatively or additionally, the queue can be selected using a configuration register that can designate the queue to use.

At step 708, the process 700 includes outputting the write transaction for writing to the processor memory. In various examples, the process 700 does not include waiting for a response to the write transaction. Instead, in these examples, the process 700 includes continuing with execution of instructions.

In some examples, the process 700 further includes determine that the queue in the memory is full. In these examples, the process 700 includes discarding the notification rather than sending the notification to the full queue. In some examples, the process 700 includes setting a field in the last notification that can be added to the queue (e.g., the notification that will make the queue full) that indicates that subsequent notifications may be dropped.

In some examples, the process 700 further includes determine that the queue is full, where the queue may be for certain types of notifications. For example, the queue may have been designated to receive explicit notifications. In this and other examples, the process 700 can further include, upon decoding an instruction to generate a new notification, stalling further execution of the instructions. Further execution of instructions can resume once there is space available in the queue for the new notification. In some examples, the process 700 can include dropping the notification instead of stalling. In some examples, whether to stall or to drop the notification can be configurable.

In various examples, notifications generated according the process 700 can be used for various purposes. For example, the process 700 can include sorting notifications generated by the integrated circuit by the timestamp included in each notification, to produce a timeline of internal status of the integrated circuit during operation of the integrated circuit. This timeline can be used to determine whether the integrated circuit and/or the program code executed by the integrated circuit operated as expected, to debug the integrated circuit and/or the program code when the operation was not as expected, and/or to determine whether the integrated circuit and/or program code is meeting performance requirements (e.g., is the program code being executed at a prescribed rate). In various examples, the notifications can be put to other uses.

Figure 8:
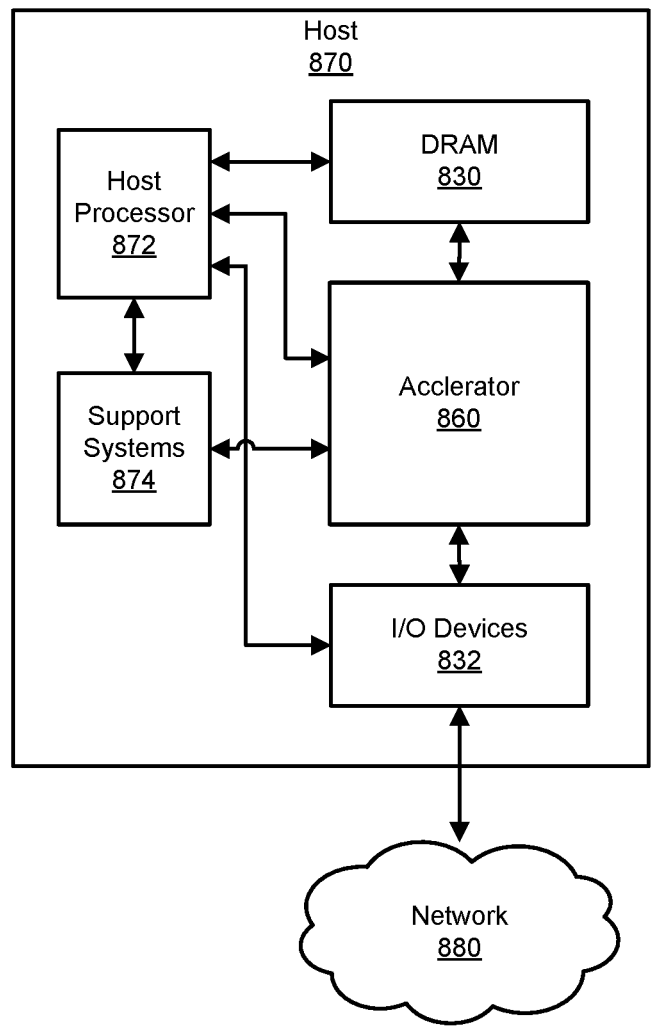
FIG. 8 includes a block diagram that illustrates an example of a host system in which an accelerator can be used.

FIG. 8 includes a block diagram that illustrates an example of a host system 870 in which an accelerator 860 can be used. The example host system 870 includes the accelerator 860, a host processor 872, DRAM 830 or processor memory, I/O devices 832, and support systems 874. In various implementations, the host system 870 can include other hardware that is not illustrated here.

The host processor 872 is a general purpose integrated circuit that is capable of executing program instructions. The host processor 872 can also be referred to as a CPU. The host processor 872 can be responsible for the overall management and control of the host system 870, including executing an operating system for the host system 870. In some examples, the host processor 872 can include multiple processing cores. In some examples, the host system 870 can include more than one host processor. In some examples, the host processor 872 and the accelerator 860 can be one chip, such as, for example, one or more integrated circuits within the same package.

The DRAM 830 can include memory that is used by the host processor 872 for storage of program code that the host processor 872 is in the process of executing, as well as for storage of values that are being operated on by the host processor 872. In some examples, the DRAM 830 is also accessible to the accelerator 860. In some examples, the DRAM 830 includes separate memory or memory banks for processor memory and for use by the accelerator 860. DRAM is a common term for small, fast memory used for processor memory, and though DRAM is volatile memory, in various examples volatile and/or non-volatile memory can be used.

The I/O devices 832 can include hardware for connecting to user input and output devices, such as keyboards, monitors, and printers, among other devices The I/O devices 832 can also include storage drives and/or a network interface for connecting to a network 880.

In various implementations, the support systems 874 can include hardware for coordinating the operations of the accelerator 860. For example, the support systems 874 can include one or more data management processors, which can management the movement of data into and out of on the accelerator 860. A data management processor is another example of an integrated circuit device that can be referred to as an accelerator. In some examples, the data management processors and the accelerator 860 can be on one device, such as one integrated circuit on the same die and in the same package.

In various examples, software programs executing on the host processor 872 can receive or generate input for processing by the accelerator 860. The programs can include, for example, graphics intensive programs such as video games or computer-aided design programs, computationally intensive programs such as modeling programs, or artificial intelligence programs such as speech recognition or image recognition programs. In various examples, the host processor 872 can determine to offload operations on input received from such programs to the accelerator 860, which can perform the operations more quickly than the host processor 872.

To assist the host processor 872 in using the accelerator 860, the host processor can be executing a device driver or driver program for the accelerator 860. Similar to any other hardware driver, the driver program for the accelerator 860 can provide an interface through which an operating system can send requests to the accelerator 860 and receive results. Upon receiving a request, which can include data and an operation to be performed on the data, the driver program can handle execution of the operation by the accelerator 860, leaving the operating system free to perform other operations.

In various examples, handling a request for the accelerator 860 can including programming and activating a data management processor, which may be a component in the support systems 874 or in the accelerator 860. Programming the data management processor can include, for example, triggering a DMA transaction to copy program code from the DRAM 830 to the data management processor, and triggering the data management processor to execute the code. Once the data management processor begins executing code, the driver program need not take further action until the operation being performed by the accelerator engine 860 is finished.

In various examples, the code executed by the data management processor can configure the accelerator 860, including copying program code and input data into the accelerator engine 860 and triggering the accelerator engine 860 to being execution of the code. The data management processor can wait on the accelerator 860 to finish perform the operation, and can then copy any result of the operation from the accelerator 860 and into DRAM 830, for example, the data management processor can then inform the driver program that results are ready, which can then inform the operating system or the program for which the result was computed.

In some examples, the operations of the support systems 874 can be handled by the host processor 872. In these examples, the support systems 874 may not be needed and can be omitted from the host system 870.

Figure 9:
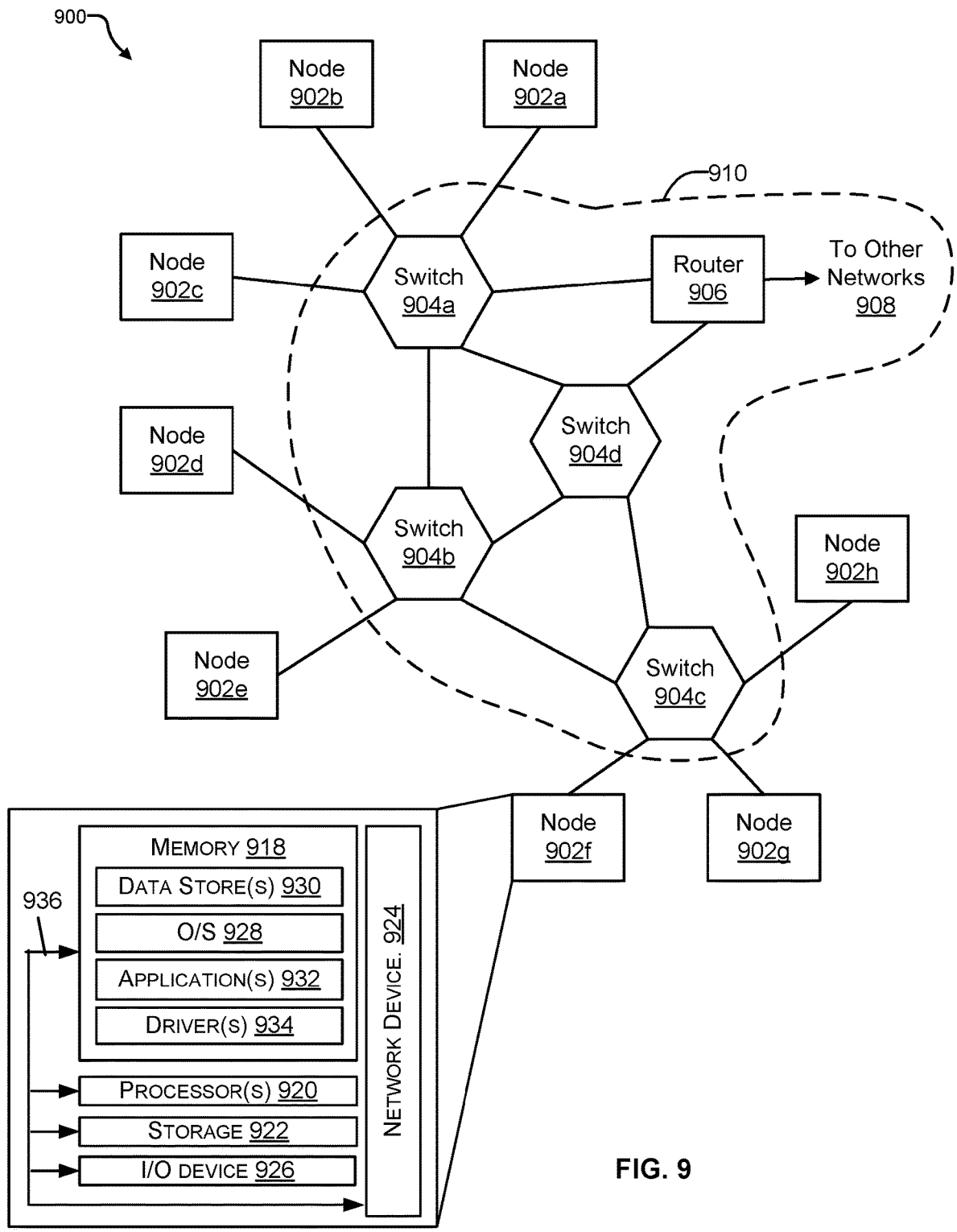
FIG. 9 illustrates an example architecture for features and systems described herein that includes one or more service provider computers and/or a user device connected via one or more networks, according to certain aspects of the disclosure.

FIG. 9 includes a diagram of an example network 900, which can include one or more host systems, such as the host system illustrated in FIG. 8. For example, the example network 900 of FIG. 9 includes multiple nodes 902a-902h, one or more of which can be a host system such as is illustrated in FIG. 10. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data was gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include any one or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system, comprising:
   a processor;
   a processor memory communicatively coupled to the processor, wherein the processor uses the processor memory to store instructions implementing a program that when executed causes the processor to:
   configure a plurality of queues in the processor memory; and
   read a new notification from a particular queue of the plurality of queues when the program determines that the new notification is available in the particular queue; and an accelerator including an instruction memory and an execution circuit, wherein the instruction memory is operable to store a subset of the program instructions, and wherein the execution circuit is operable to execute the instructions, wherein the accelerator is operable to:
  determine, at a point in time during execution of the subset of the program instructions stored in the instruction memory, to generate a notification, wherein the notification includes a type and a timestamp indicating the point in time, and wherein the notification includes information about an internal status of the accelerator at the point in time;
  determine a destination queue from the plurality of queues to which to send the notification, wherein the destination queue is determined based on the type of the notification;
  generate a write transaction including the notification, wherein the write transaction is addressed to the destination queue; and
  output the write transaction for writing to the processor memory.

2. The computing system of claim 1, wherein the program when executed is further operable to:
  configure the accelerator with a location in the processor memory for each of the plurality of queues, wherein the accelerator stores, for each queue, a base address and a size, and wherein the accelerator operates each queue as a first-in, first out buffer.

3. The computing system of claim 1, wherein the type indicates whether the notification is for a synchronization event, an error, or an explicit notification instruction.

4. The computing system of claim 1, wherein the program when executed is further operable to:
  sort notifications from the accelerator that are written to different queues according to timestamps included with each notification; and
  output the notifications, wherein the notifications provide a timeline of operation of the accelerator.

5. An integrated circuit, comprising:
  an output interface configured to communicate with components of a computing system;
  wherein the integrated circuit is configured to:
    determine, at a point in time during operation of the integrated circuit, to generate a notification, wherein the notification includes a type and a timestamp indicating the point in time, and wherein the notification includes information about an internal status of the integrated circuit at the point in time;
    selecting a queue from a plurality of queues in a processor memory of the computing system;
    generate a write transaction including the notification, wherein the write transaction is addressed to the queue;
    output the write transaction using the output interface; and
    determine to generate a second notification concurrent with determining to generate the notification, wherein the second notification includes a same timestamp as the timestamp included in the notification.

6. The integrated circuit of claim 5, wherein the integrated circuit is further configured to:
  determine that a change of status of a register associated with an event has occurred, wherein determining to generate the notification is based on the change of status, and wherein the internal status included in the notification indicates the change of status.

7. The integrated circuit of claim 6, wherein the integrated circuit is further configured to:
  determine whether generation of the notification for the event is enabled or disabled.

8. The integrated circuit of claim 6, wherein the integrated circuit monitors the register for the change of status, and wherein the status is changed by a write transaction received by the integrated circuit from external to the integrated circuit.

9. The integrated circuit of claim 6, wherein the integrated circuit includes a plurality of registers associated with a plurality of events, and wherein the notification includes an identifier for the event.

10. The integrated circuit of claim 5, wherein the integrated circuit is further configured to:
  determine that an error in an operation of the integrated circuit has occurred, wherein determining to generate the notification is based on the error having occurred, and wherein the internal status included in the notification an identifier for the error.

11. The integrated circuit of claim 10, wherein the integrated circuit is further configured to:
  determine whether generation of the notification for the error is enabled or disabled.

12. The integrated circuit of claim 5, further comprising:
  an instruction memory configured to store instructions;
  an execution circuit, wherein operation of the integrated circuit includes execution of the instructions.

13. The integrated circuit of claim 12, wherein the integrated circuit is further configured to:
  decode an instruction for generating the notification, wherein determining to generate the notification is based on the instruction, and wherein the internal status included in the notification indicates information provided by the instruction.

14. The integrated circuit of claim 13, wherein the information provided by the instruction includes a counter identifier, and wherein the notification includes a value of a counter identified by the counter identifier.

15. The integrated circuit of claim 13, wherein the information provided by the instruction includes a token, wherein the token is a value included in the instruction, and wherein the notification includes the value of the token.

16. The integrated circuit of claim 13, wherein the instruction includes an identifier for the queue, and wherein selecting the queue includes using the identifier.

17. The integrated circuit of claim 12, wherein the integrated circuit is further configured to:
  determine that the queue is full; and
  upon decoding an instruction to generate a new notification, stall further execution of the instructions.

18. The integrated circuit of claim 5, wherein the integrated circuit is further configured to:
  determine that the queue is full; and
  discard the notification.

19. The integrated circuit of claim 18, further comprising:
  generating, when the queue is not full, a second write transaction for second notification, wherein the second write transaction is addressed to the queue, and wherein the second notification includes an indicator that indicates that the notification was dropped.

20. A method for operating an integrated circuit, comprising:
- determining, at a point in time during operation of the integrated circuit, an internal status of the integrated circuit;
- determining to generate a notification including the internal status at the point in time, wherein the notification includes a type and a timestamp indicating the point in time;
- selecting a queue from a plurality of queues in a processor memory;
- generating a write transaction including the notification, wherein the write transaction is addressed to the selected queue in the processor memory;
- outputting the write transaction for writing to the processor memory; and
- determining to generate a second notification concurrent with determining to generate the notification, wherein the second notification includes a same timestamp as the timestamp included in the notification.

21. The method of claim 20, wherein the internal status describes a current operational state of hardware of the integrated circuit.

22. The method of claim 20, wherein the internal status describes a current operational state of program instructions being executed by the integrated circuit.

23. The method of claim 20, wherein the queue is selected based on the type included in the notification.

24. The method of claim 20, wherein the queue is selected based on a value in a configuration register.

25. The method of claim 20, wherein the queue is selected based on a value in an instruction that triggers the notification.

26. The method of claim 20, wherein a same time generation circuit is used to obtain timestamps for the notification and all subsequent notifications generated by the integrated circuit.

* * * * *